(12) United States Patent
Palmer

(10) Patent No.: US 7,699,130 B2
(45) Date of Patent: Apr. 20, 2010

(54) WHEELED VEHICLE

(75) Inventor: Anna Palmer, 5200 N. Sheridan Rd., #429, Chicago, IL (US) 60640

(73) Assignee: Anna Palmer, Chicago, IL (US)

( * ) Notice: Subject to any disclaimer, the term of this patent is extended or adjusted under 35 U.S.C. 154(b) by 0 days.

(21) Appl. No.: 11/893,024

(22) Filed: Sep. 14, 2007

(65) Prior Publication Data

US 2009/0071740 A1 Mar. 19, 2009

(51) Int. Cl.
*B62K 15/00* (2006.01)

(52) U.S. Cl. .................. 180/180; 180/208; 180/65.1; 180/215; 180/210; 280/87.041

(58) Field of Classification Search .............. 180/220, 180/215, 216, 208, 210, 180, 65.1, 181; 280/87.01, 280/87.03, 87.021, 87.041, 13, 87.031, 87.05
See application file for complete search history.

(56) References Cited

U.S. PATENT DOCUMENTS

| 593,360 | A | * | 11/1897 | Lottermoser | 248/541 |
|---|---|---|---|---|---|
| 3,001,599 | A | * | 9/1961 | Fryar | 180/208 |
| 3,309,104 | A | * | 3/1967 | Gold | 280/87.041 |
| 4,186,934 | A | * | 2/1980 | Collings | 280/221 |
| 4,244,550 | A | * | 1/1981 | Yamada | 248/534 |
| 4,637,534 | A | * | 1/1987 | Leppek | 224/439 |
| 5,183,129 | A | * | 2/1993 | Powell | 180/208 |
| 5,307,756 | A | * | 5/1994 | Ichimura et al. | 116/166 |
| 5,505,221 | A | * | 4/1996 | Gao | 135/20.1 |
| 5,921,669 | A | * | 7/1999 | Taylor et al. | 362/476 |
| D414,220 | S | | 9/1999 | Catto | |
| 6,223,865 | B1 | * | 5/2001 | Lang et al. | 188/73.31 |
| 6,227,324 | B1 | | 5/2001 | Sauve | |
| 6,345,678 | B1 | | 2/2002 | Chang | |
| 6,378,539 | B1 | | 4/2002 | Allee | |
| 6,860,304 | B1 | * | 3/2005 | Dalrymple | 152/175 |
| 2002/0000702 | A1 | * | 1/2002 | Charron | 280/87.021 |
| 2002/0020570 | A1 | * | 2/2002 | Hayashi | 180/65.1 |
| 2002/0066610 | A1 | * | 6/2002 | Tsai | 180/220 |
| 2002/0088834 | A1 | * | 7/2002 | Wolfgram | 224/629 |
| 2002/0108798 | A1 | * | 8/2002 | Huntsberger et al. | 180/220 |
| 2004/0188153 | A1 | | 9/2004 | Liu | |
| 2006/0042844 | A1 | * | 3/2006 | Kirkpatrick et al. | 180/65.2 |

* cited by examiner

*Primary Examiner*—Ruth Ilan
(74) *Attorney, Agent, or Firm*—Anne McGovern Burkhart

(57) ABSTRACT

An improved wheeled vehicle includes a platform adapted and constructed to support an operator of the vehicle. A plurality of wheels support the vehicle for movement on a surface, the plurality of wheels including at least one front wheel adapted and constructed to steer the vehicle, and at least one rear wheel adapted to be driven to impart motion to the vehicle. A handlebar assembly is connected to at least one of the wheels of the vehicle. The handlebar assembly provides directional control of the vehicle, and extends toward the rear of the platform. A motorized drive mechanism is connected to at least one of the wheels, whereby actuation of the drive mechanism causes the vehicle to move along a surface. A control mechanism actuated by the foot of a user includes at least one pedal, and is used to accelerate and decelerate the vehicle.

1 Claim, 2 Drawing Sheets

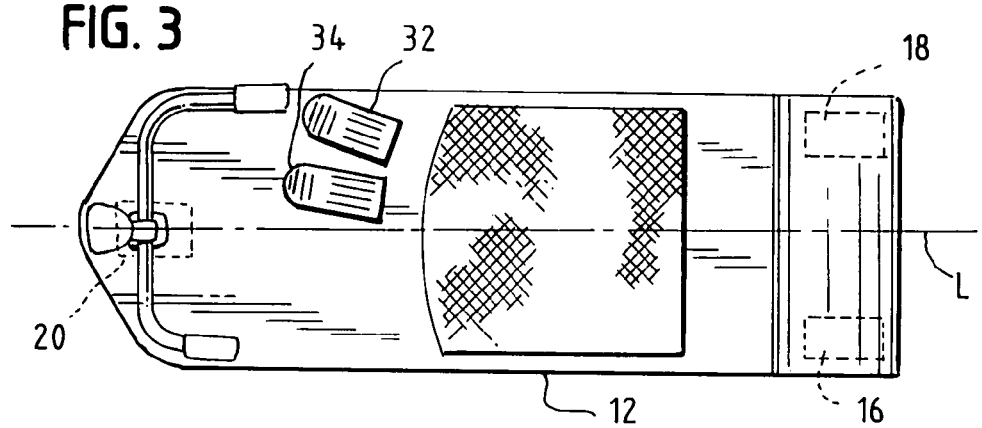
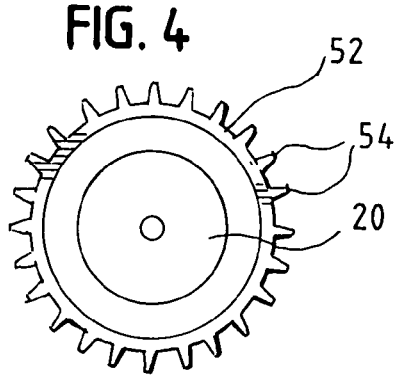
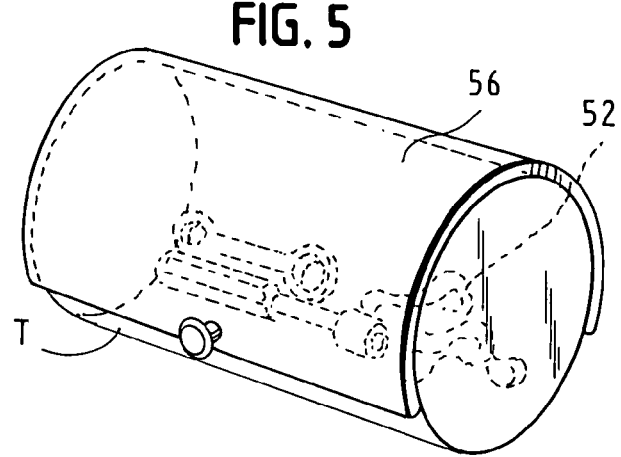
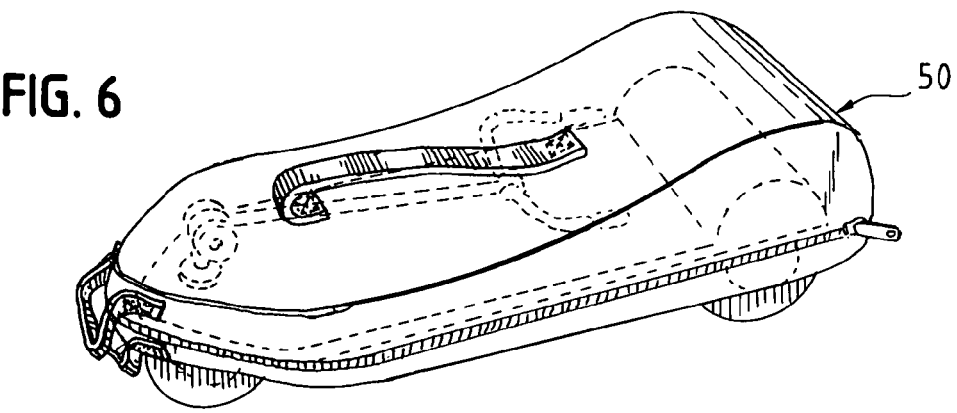

WHEELED VEHICLE

CROSS-REFERENCE TO RELATED APPLICATIONS

None

STATEMENT AS TO RIGHTS TO INVENTING MADE UNDER FEDERALLY-SPONSORED RESEARCH AND DEVELOPMENT

None

FIELD OF THE INVENTION

The invention relates generally to vehicles, and specifically to vehicles designed to accommodate a single rider, such as scooters.

DESCRIPTION OF RELATED ART

Although the modern vehicle known as the "scooter" has been hand-made in industrial urban areas for at least 100 years, the origins of the vehicle itself go back further still. It is thought that the first multi-wheeled vehicles were the precursors of modern scooter, having two roughly parallel wheels and a frame intended to be stood upon by a rider. In more recent times, scooters were fabricated by attaching roller skate wheel sets to a board or platform, commonly made of scrap wood. A handle of some sort was typically secured to the platform for steering and added stability. Steering is provided by leaning, or by employing a pivoting connection to add a second board to the first.

In the late 1990's, a sleeker, narrower folding version of the kick scooter was developed. This type of scooter employed an aluminum deck and two synthetic wheel of the type used in rollerblades. Steering was provided by a forward-mounted pivoting handle connected to the front wheel, and braking was accomplished by means of a hinged fender which, when pressed, dragged against the rear wheel.

Motorized versions of scooters are also known. Such scooters are powered by small electric or a gas motors. Electric scooters can travel from 10 to 25 miles per hour depending on the model, and go 10 to 15 miles on a charge (depending on the rider's weight and riding style). Gas scooters have more power, travel farther, and attain higher speeds than electric scooters, as well as offering more options for upgrades and engine modifications.

Scooters of various configurations have been the subject of a high degree of inventive activity, some of which is represented in the patent literature. For example, U.S. Pat. No. 6,227,324 to Sauve is directed to an electrically powered scooter having a chassis with a platform upon which the rider stands, a front wheel mounted to provide steering control and a rear wheel rotatably mounted at the rear section of the chassis. A pedal is pivotably mounted at the rear section of the chassis and is attached to the motor and drive wheel. The pedal, in an inactive position holds such drive wheel in a position where it does not contact the rear wheel. When the pedal is depressed by the foot of the rider, the motor is turned on and the drive wheel contacts the rear wheel, propelling the scooter forward. When released, the pedal returns automatically by spring means to its inactive position, breaking the contact of the rear wheel with the drive wheel, and automatically turning the motor off.

U.S. Pat. No. 4,186,934 to Collings deals with a scooter vehicle having a chassis, and a front wheel mounted on the center line of the chassis, a rear wheel mounted on the chassis, and a steering column attached to the front wheel. A pair of ratchet gears are connected one to each of the rear wheels. A platform is rotatively mounted on the chassis. The platform has front and rear foot portions mounted with an angle of less than 180 degree between them. First chain means connects the front of the platform for driving one of the ratchet drive wheel gears and second chain means connects the rear of the platform for driving the other of the ratchet drive wheel gears.

In U.S. Pat. No. 6,345,678 to Chang, a scooter has a main frame, two rear bars, a rear wheel, and a rear wheel drive mechanism. The rear bars are disposed on a rear end of the main frame. The rear wheel drive mechanism has a rechargeable battery set, an electric motor, a brake device, a first protective casing, a worm wheel, and a second protective casing. The brake device, the rear wheel, the first protective casing, the worm wheel, and the second protective casing are disposed between the rear bars. The electric motor has a drive shaft and a worm. The worm wheel has a pivot shaft passing through the first protective casing, a one-way bearing, the rear wheel, a main bearing, an auxiliary bearing, and the pivot shaft inserted in the brake device. The worm engages with the worm wheel.

Turning next to U.S. Pat. No. 6,378,539 to Allee, a modified umbrella and a storage sheath are all mounted on a wheelchair. The umbrella's lower end is modified with a threaded surface received in a hole of the umbrella holder. The umbrella holder is used to hold the umbrella in an upright position may be mounted to the frame structure of the transporter in different ways. One is to fit in the end of a transporter's arm rest where held by fasteners. Another is to clamp it around the arm rest and holder. If it is desired to mount the umbrella holder vertically, extensions configured in the shape of the arm rest may be used. The sheath is also mounted to the frame structure of the transporter. The sheath mounting can be done in several ways. One is by plastic tie(s) around the sheath and around the frame structure. Another is by bolts that extend through the sheath into the transporter's seat or by a clamp structure. The sheath's end cap may be held to the sheath by glue and a bolt that goes across the hollow interior of the sheath to insure the umbrella does not fall through.

U.S. Design Pat. No. D414,220 to Catto shows an ornamental design for an electric scooter.

United States Published Application No. 2004/0188153 to Liu is directed to an electric motorized scooter including a base having a front wheel and a rear wheel on two ends thereof, and a steering tube is rotatably connected to the base and a handle is connected to a top end of the steering tube. Two side wheels are connected to two sides of the base and driven by two motors. An electric differential includes a motor controlling unit which is electrically connected to the two motors so as to respectively control the speeds of the two motors. A steering control device includes an operation device and a steering unit which is electrically connected to the motor controlling unit. When turning the scooter, the two side wheels moves at different speeds so that the scooter can be turned at small angle.

Finally, in United States Published Application No. 2002/0108798 to Huntsberger, a battery-powered scooter has a body with a footboard upon which a rider may stand while riding the scooter, and a steering mechanism that is used to steer the scooter. The scooter further includes a drive assembly with a battery-powered motor assembly adapted to drive at least one of the scooter's wheels. In some embodiments, the scooter further includes a cover assembly adapted to prevent a user's body from contacting portions of the drive assembly.

In some embodiments, the scooter includes a storage compartment beneath its riding surface.

Although these known scooter assemblies provide some advantages, they present significant drawbacks as well. For example, all of these scooters have relatively complex or unwieldy operating controls. They also fail to provide riders adequate protection from the elements. It can be seen from the foregoing that the need exists for a simple and inexpensive scooter assembly having operational controls that minimize the potential for rider distraction.

SUMMARY

In accordance with the principles of the present invention, an improved wheeled vehicle includes a platform adapted and constructed to support an operator of the vehicle. A plurality of wheels support the vehicle for movement on a surface, the plurality of wheels including at least one front wheel adapted and constructed to steer the vehicle, and at least one rear wheel adapted to be driven to impart motion to the vehicle. A handlebar assembly is connected to at least one of the wheels of the vehicle. The handlebar assembly provides directional control of the vehicle, and extends toward the rear of the platform. A motorized drive mechanism is connected to at least one of the wheels, whereby actuation of the drive mechanism causes the vehicle to move along a surface. A control mechanism actuated by the foot of a user includes at least one pedal, and is used to accelerate and decelerate the vehicle.

The invention itself, however, both as to organization and method of operation, together with further objects and advantages thereof, may be best understood by reference to the following description taken in conjunction with the accompanying drawings.

BRIEF DESCRIPTION OF THE DRAWINGS

FIG. 3 illustrates a plan view of the wheeled vehicle of FIG. 1.

FIG. 4 illustrates a side elevational view of a wheel used in conjunction with the wheeled vehicle of FIG. 1.

FIG. 5 illustrates a perspective view of an accessory container used in conjunction with the wheeled vehicle of FIG. 1.

FIG. 6 illustrates a perspective view of a storage bag used in conjunction with the wheeled vehicle of FIG. 1.

DETAILED DESCRIPTION OF PREFERRED EMBODIMENTS

Figure 1:
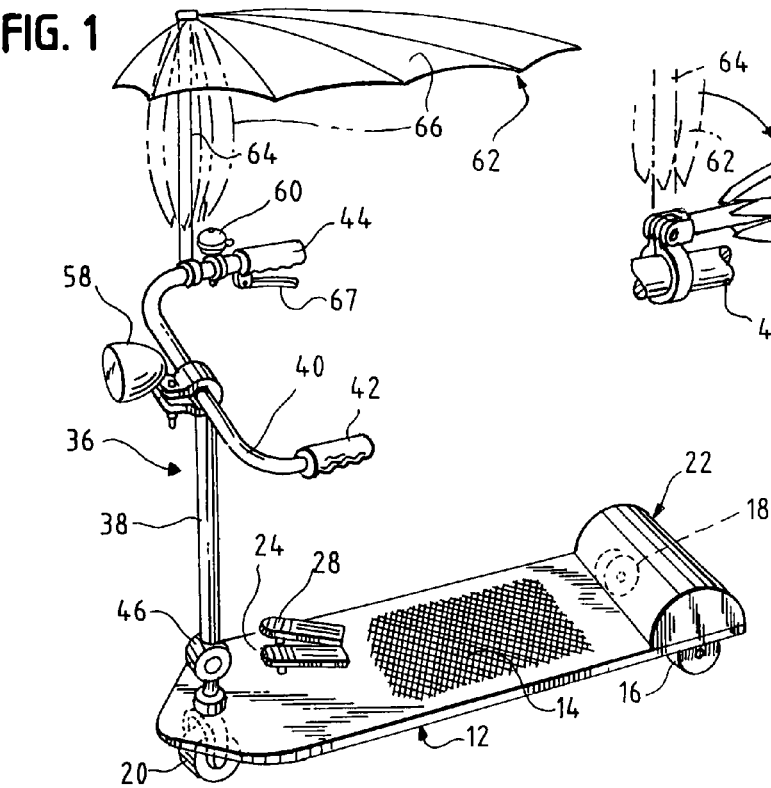
FIG. 1 illustrates a perspective view of a wheeled vehicle in accordance with the principles of the present invention.

While this invention is susceptible of embodiment in many different forms, there is shown in the drawings, and will herein be described in detail, exemplary embodiments, with the understanding that the present disclosure is to be considered as illustrative of the principles of the invention and not intended to limit the invention to the exemplary embodiments shown and described.

FIG. 1 illustrates a scooter or wheeled vehicle 10 in accordance with the principles of the present invention. The wheeled vehicle 10 includes a generally planar platform 12 adapted and constructed to support a rider of the vehicle 10 in a standing position. The platform 12 can be fabricated from any suitably rigid, lightweight, and durable material. It is contemplated that constructing the platform from aluminum would provide the desired qualities. The platform 12 is provided with a non-slip surface 14. The surface 14 can be provided by texturing the surface of the platform directly, or by applying a suitable non-slip and frost-resistant material to the top of the platform, for example, by gluing or coating.

Figure 2:
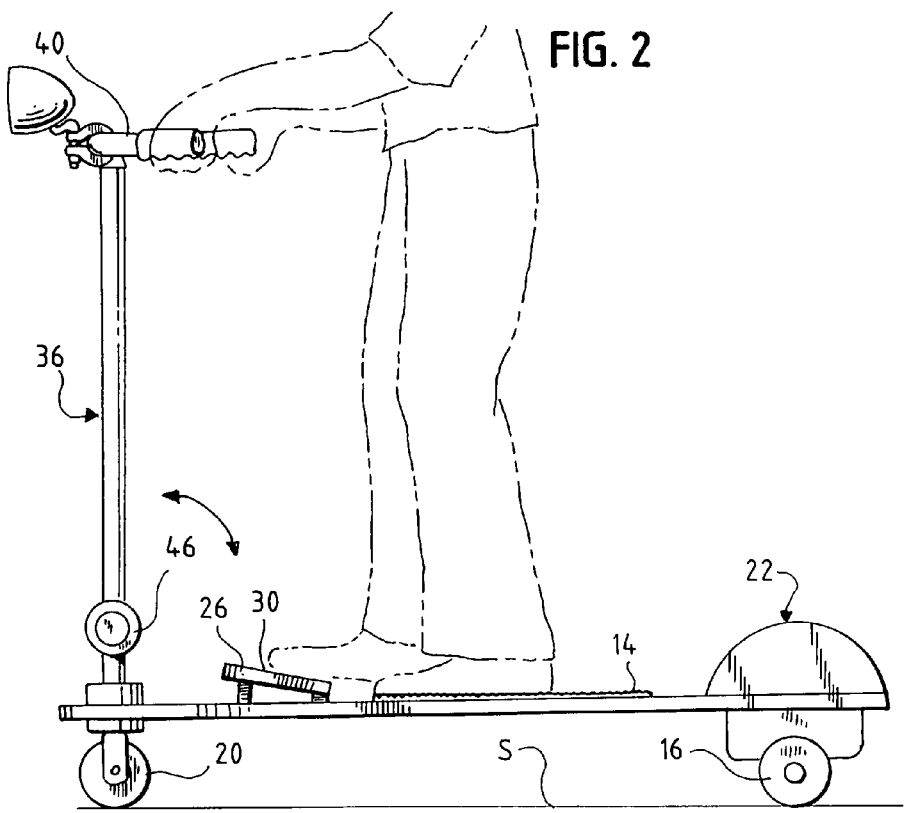
FIG. 2 illustrates a side elevational view of the wheeled vehicle of FIG. 1.

Rear wheels 16, 18, and a front wheel 20 are rotatably secured to the platform 12 to support the vehicle 10 for movement along a surface S (FIG. 2). The rear wheels 16, 18 are provided as drive wheels operatively connected to a motor assembly 22 in a known manner, such as by a gear drive or belt drive mechanism. The motor assembly 20 can be provided as a battery powered electric motor, a gas-powered motor, or as any suitable motive force. The motor assembly 22 can also act as a braking mechanism, as is known in the art. Alternatively, any suitable braking mechanism can be employed.

As shown in FIGS. 1-3, pedals 24, 26 on the platform 12 are operatively connected to the motor assembly 22, and are used to actuate the motor assembly 22 to accelerate (pedal 24) and decelerate (pedal 26) the vehicle 10. The pedals 10 are positioned to enhance the stability and balance of the vehicle. The pedals 24, 26 are provided with a non-slip and frost-resistant surface texture in the same manner as the platform 12, and have inclined upper contact surfaces 28, 30 and rounded edges 32, 34, and are angled along a natural range of motion of an operator's foot, to facilitate ease of use. It is contemplated that the pedals 24, 26 can be advantageously fabricated from a suitably strong, durable, and lightweight material such as aluminum.

A steering assembly 36 provides stability and steering for the vehicle 10. The steering assembly 36 is rotatably connected to the platform 10 by means of a bearing or other suitable mechanism, and is connected to the wheel 20 to provide directional control of the vehicle 10 during use, again by a suitable known mechanism. The steering assembly 36 includes an upright shaft 38 and a handlebar 40, which can be fabricated from any suitable rigid and lightweight material, such as tubular aluminum. The handlebar 40 includes a pair of grips 42, 44, and extends towards the rear of the vehicle 10.

The steering assembly 36 is provided with a first hinge connection 46. The hinge connection 46 facilitates selective placement of the vehicle 10 to between in an in-use position in which the stem 38 is upright and the handlebar 40 is horizontal, and a transport position in which the steering mechanism is folded towards the platform 12. In the transport position, the vehicle 10 can be placed in a storage bag 50 (FIG. 6) for storage and transport of the vehicle 10. A plurality of apertures 51 are provided in the bag 50 to allow the wheels of the vehicle 10 to protrude from the bottom of the bag 50. This allows the vehicle 10 to be rolled on the wheels when the vehicle 10 is being transported in the bag 50.

One or more of the wheels 16, 18, 20 can be provided with a plurality of traction studs to enhance the performance of the vehicle 10 on ice or other slippery surfaces. As shown in FIG. 4, the wheel 20 is provided with a removable band 52 from which the traction studs 54 protrude. The removable band can be fabricated from a strong, elastic material such as rubber. The band 52 is stretched and placed over the wheel 20 when it is anticipated that enhanced traction will be needed, such as when icy road conditions are prevalent. It is contemplated that providing a traction-enhancing band for all of the wheels of the vehicle will maximize traction in hazardous conditions. When the band 52 is not needed, it can be stretched and removed from the wheel 20, and stored in a convenient place. A storage bag 56, as shown in FIG. 5, provides an advantageous storage compartment for bands 52 and other tools T that may be helpful in maintaining and operating the vehicle 10. The storage bag 56 can be attached to the handlebar 40 or otherwise conveniently secured to the vehicle 10.

Figure 1A:
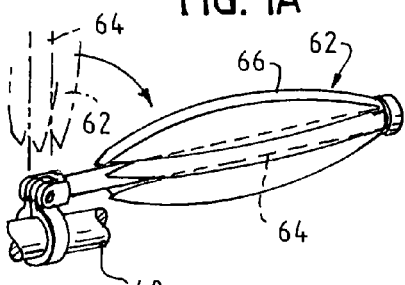
FIG. 1A illustrates a detailed view of a canopy shown in FIG. 1.

The steering assembly 36 can also be the site of advantageous accessories to be used in conjunction with the vehicle 10. A light 58 and warning device 60 such as a bell or horn are secured to the handlebar 40. A folding umbrella assembly 62 includes a shaft 64 secured to and extending upwardly from the handlebar 40. An asymmetrical umbrella canopy 66 is supported by the shaft 64. The asymmetry of the canopy 66 allows the canopy to extend over the platform 12 a sufficient distance to protect a user of the vehicle 10 from the element, while extending only minimally toward the outside of the platform 12. FIG. 1A illustrates a detailed view of the canopy 66 in its retracted and folded position.

It can be seen from the foregoing that the present invention provides advantages in a wide range of applications. For example, a hand brake 74 can be provided to increase braking safety. The standing position for the rider of the vehicle and separation and location of the control pedals of the present invention increases the versatility of the vehicle, making it suitable for a variety of users of all ages, for commuting to work or classes, or for conveying people from office to office in large buildings. The folding ability of the vehicle makes it compact and streamlined, with the bag being advantageous for tourists and other travelers. While details of the invention are discussed herein with reference to some specific examples to which the principles of the present invention can be applied, the applicability of the invention to other devices and equivalent components thereof will become readily apparent to those of skill in the art. Accordingly, it is intended that all such alternatives, modifications, permutations, and variations to the exemplary embodiments can be made without departing from the scope and spirit of the present invention.

What is claimed is:

1. An improved wheeled vehicle comprising the following:
a platform having a front end and a back end divided by a central axis, the platform being adapted and constructed to support an operator of the vehicle with the operator in a standing position while driving the vehicle;
a non-slip textured surface on the platform;
a plurality of wheels supporting the vehicle for movement on a surface, the plurality of wheels including at least one front wheel adapted and constructed to steer the vehicle, and at least one rear wheel adapted to be driven to impart motion to the vehicle;
a control mechanism for controlling the speed of the vehicle located on the front end of the platform on one side of the central axis thereof, the control mechanism adapted to be actuated by a foot of the operator, the control mechanism including a first pedal angled along a natural range of motion of the foot of the operator for accelerating the vehicle, and a second pedal angled along a natural range of motion of the foot of the operator for decelerating the vehicle, wherein the first and second pedals are adapted to be operated by pivoting the heel of the foot of the operator;
a generally u-shaped handlebar assembly having a first grip end and a second grip end for steering the vehicle connected to at least one of the wheels of the vehicle and extending towards the back end of the platform; wherein one of the grip ends extends to a point substantially above the control mechanism, the handlebar assembly being adapted and constructed to provide directional control of the vehicle and extending toward the rear of the platform; and
a motorized drive mechanism connected to at least one of the wheels, whereby actuation of the drive mechanism causes the vehicle to move along a surface.

* * * * *